United States Patent [19]

Donahue

[11] Patent Number: 4,630,380

[45] Date of Patent: Dec. 23, 1986

[54] HOLE GAUGE

[75] Inventor: Robert L. Donahue, McPherson, Kans.

[73] Assignee: Hein-Werner Corporation, Waukesha, Wis.

[21] Appl. No.: 835,110

[22] Filed: Feb. 28, 1986

[51] Int. Cl.[4] .............................................. G01B 5/25
[52] U.S. Cl. .................................... 33/288; 33/180 AT
[58] Field of Search ............ 33/288, 180 AT, 181 AT, 33/516

[56] References Cited

U.S. PATENT DOCUMENTS

| | | | |
|---|---|---|---|
| 2,575,194 | 11/1951 | Smith | 33/180 AT |
| 3,611,575 | 10/1971 | Chartier | 33/180 AT |
| 4,319,402 | 3/1982 | Martin | 33/180 AT |
| 4,322,890 | 4/1982 | Jarman | 33/288 |
| 4,330,945 | 5/1982 | Eck | 33/288 |
| 4,454,659 | 6/1984 | Eck | 33/288 |
| 4,477,948 | 10/1984 | Azuma | 33/288 |
| 4,479,305 | 10/1984 | Wendl et al. | 33/288 |
| 4,490,918 | 1/1985 | Clausen | 33/288 |
| 4,513,508 | 4/1985 | Jarman et al. | 33/288 |
| 4,536,962 | 8/1985 | Hense | 33/516 |
| 4,573,273 | 3/1986 | Eck | 33/288 |

Primary Examiner—Willis Little
Attorney, Agent, or Firm—Litman, Day & McMahon

[57] ABSTRACT

A hole gauge arrangement is used for determining the distance of a vehicle fixture hole from a datum plane established with respect to the vehicle. The hole gauge arrangement includes a set rod with a die wheel having bores corresponding to the various sizes of fixture holes and also includes a measurement rod. By reference to a table, the desired distance from the datum plane to the fixture hole is established on the set rod and the measurement rod matched to the distance of the set rod and the hole diameter. The measurement rod is then transferred to support structure mounted in the datum plane and the distance difference, if any, between the measurement rod tip and the fixture hole is noted as an indication of dislocation.

6 Claims, 6 Drawing Figures

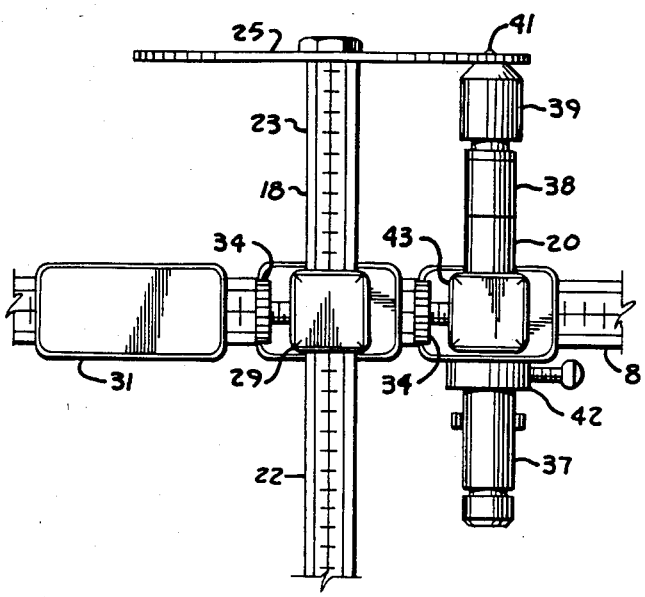
Fig. 4.
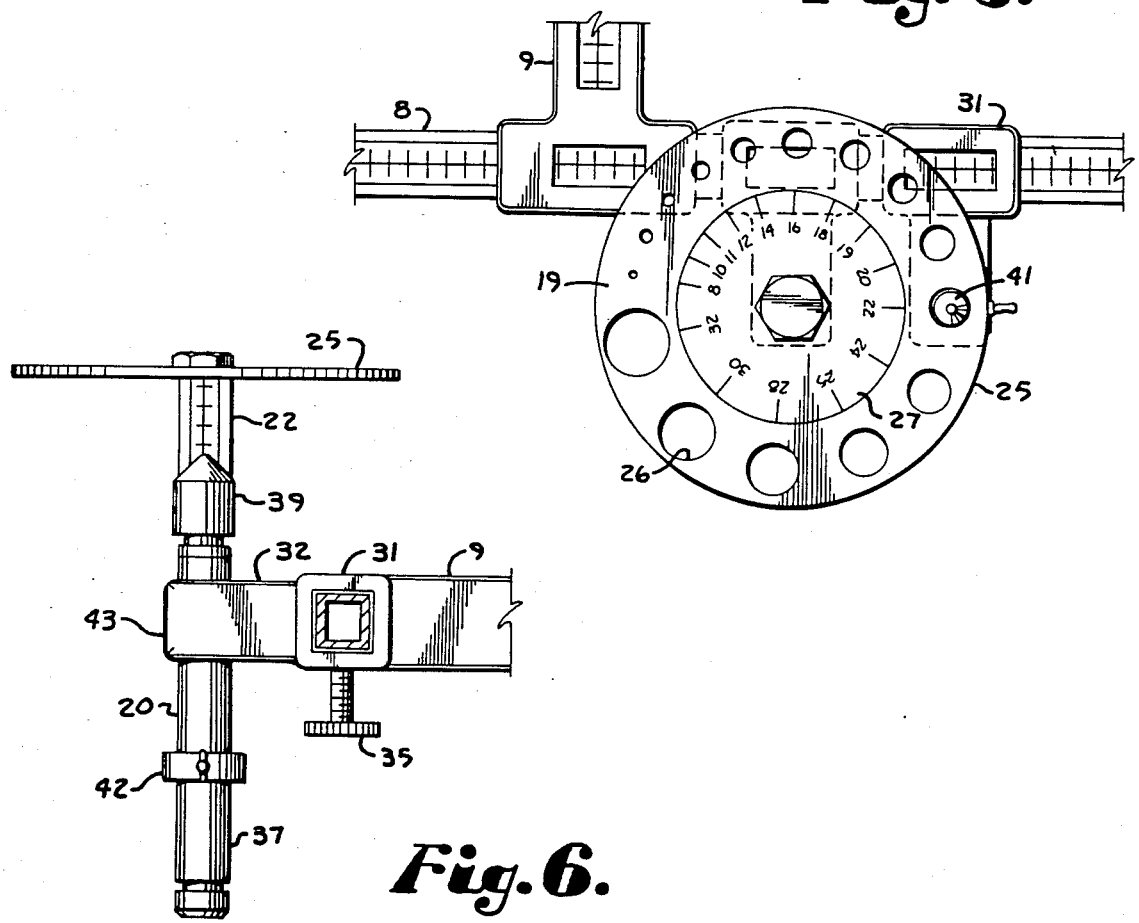
Fig. 5.
Fig. 6.

HOLE GAUGE

FIELD OF THE INVENTION

The present invention relates to a device for checking the relationships of a vehicle frame and body and in particular to such a device which indicates the relationship of a vehicle selected fixture hole to a datum plane established with respect to the vehicle.

BACKGROUND OF THE INVENTION

The frame and body of a vehicle is constructed with respect to precise geometric relationships as determined by the manufacturer in order that the vehicle have proper driving and road holding properties, as well as accurate exterior design measurement locations. In the manufacture of the vehicle, various sections and beams ultimately comprising the vehicle body and frame are positioned on fixtures or jigs and then the part is welded together to form a unitary structure. Parts are located with respect to the jig or fixture by fixture holes, which are round holes or sockets drilled in the frame so that studs extending upwardly from the fixture or jig extend into the hole. After formation of the body, these holes are often drilled and tapped to form bolt holes for mounting other body parts, such as suspension components, engine carriages and the like.

The jig or fixture is established with respect to an imaginary horizontal reference plane, or datum plane, which extends beneath the vehicle and from which upward dimensions of each fixture point are derived. Further, the fixture points are located longitudinally of the vehicle by establishing one or more zero points along the length of the vehicle. The vehicle fixture holes are also located laterally by establishing a vehicle center line and measuring outwardly. Through measurements originating at the vehicle center line, longitudinal line and datum plane, the location of each point on the vehicle can be established in X, Y and Z coordinate relationship.

The above procedure refers to the process of laying out the vehicle structure when the vehicle is manufactured. By means of a reverse process, the vehicle can be checked in a repair shop to determine if the vehicle body and frame parts are still in their proper relationship or whether there has been dislocation due to various causes, mostly collision and accidents, or even due to out of tolerance manufacturing. Through various procedures, the vehicle body and frame can be checked to blue print specifications.

The process of checking a vehicle to specifications involves referring to a vehicle frame and body book which contains tables or charts showing each vehicle by year and model, identifying critical body and frame measurement points, which normally correspond to fixture holes and joint locations, and applying those measurements to the vehicle to determine the presence of dislocation.

There are various means by which a repairman may recreate, in part or in whole, the reference capabilities of the original fixture or jig on which the car was formed. One such proper method is through the use of the Kansas Jack Laser Alignment System as disclosed in U.S. Pat. No. 4,330,945 and in Kansas Jack Patent Application Ser. No. 764,678, co-pending herewith. Other such systems are exemplified by U.S. Pat. No. 4,490,918 from Continental.

Of critical importance is the re-establishment of the vehicle datum plane, which is an imaginary plane extending under the vehicle and from which all vertical measurements are derived. The vehicle frame and body book indicates the dimensions of the vehicle frame and body parts from the datum plane and by reference to those parts which appear to be undamaged, the datum plane is re-established.

After the datum plane is re-established, the lateral and longitudinal (X and Y) dimensions are re-established by reference to the vehicle frame and body book and by positioning a support structure in the datum plane at the correct X and Y location, such as shown in Patent Application Ser. No. 764,678 filed 8/12/85. The next step is to measure the Z axis dimension, or the vertical height from the datum plane to the fixture hole. Again, that dimension is provided in the vehicle frame and body book. One such method of indicating that dimension is through the use of a laser projector such as shown in Patent Application Ser. No. 764,678 or more crudely by rulers or measuring tapes. The area is often too restricted by other various frame and body parts to permit optical scanning, and hand held measurement bars often do not provide sufficient exactness. Moreover, it is preferable to leave rods in place which extend from the datum plane to the fixture hole, for this arrangement enables the repairman to detect at a glance whether there has been any shift between the established datum plane and the vehicle frame and body after commencing repair procedures. Normally, these repair procedures involve exerting pulls or pushes on various parts of the vehicle through hydraulic or pneumatic rams, and the vehicle may be moved about significantly during the repair process. If the pointers extending from the fixture holes to the datum plane stay in position during this process, it assures the repairman that the datum plane system remains properly positioned with respect to the vehicle frame and body and that the reference remains true.

OBJECTS OF THE INVENTION

The principle objects of the present invention are: to provide a hole gauge arrangement for determining the correct distance between a vehicle fixture hole and a datum plane; to provide such a hole gauge arrangement which provides correct measurement with respect to the vehicle holes regardless of the diameter of the hole; to provide such a hole gauge arrangement which is relatively easy to set; and to provide such a hole gauge arrangement which is relatively inexpensive, sturdy and efficient in use and particularly well adapted for the intended purpose.

Other objects and advantages of this invention will become apparent for the following description taken in connection with the accompanied drawings are set forth, by way of illustration and example, certain embodiments of this invention.

DESCRIPTION OF THE DRAWINGS

FIG. 4 is a sectional view taken along lines 4—4, FIG. 1.

FIG. 5 is an enlarged, plan fragmentary view of a portion of the hole gauge arrangement shown in connection with the vehicle.

FIG. 6 is a sectional view taken along lines 6—6, FIG. 1.

DESCRIPTION OF THE PREFERRED EMBODIMENT

Figure 1:
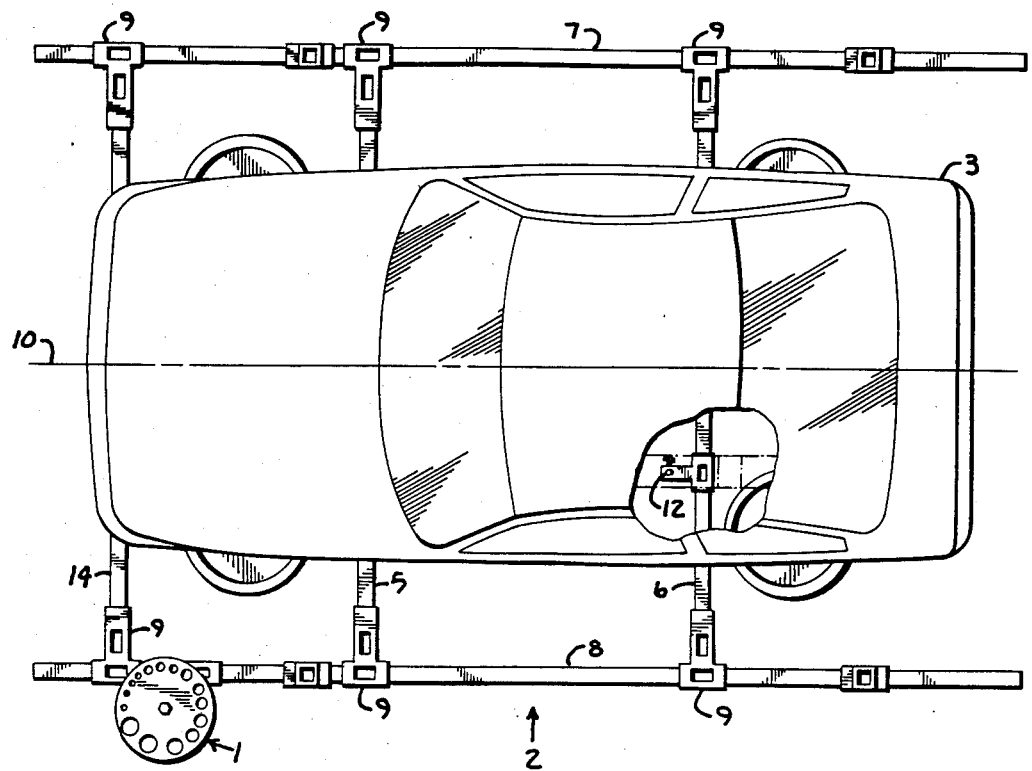
FIG. 1 is a plan view of a vehicle frame and body measuring system mounted upon a vehicle and including a hole gauge arrangement embodying the present invention. The hole gauge is enlarged with respect to the vehicle for purposes of clarity.
Figure 2:
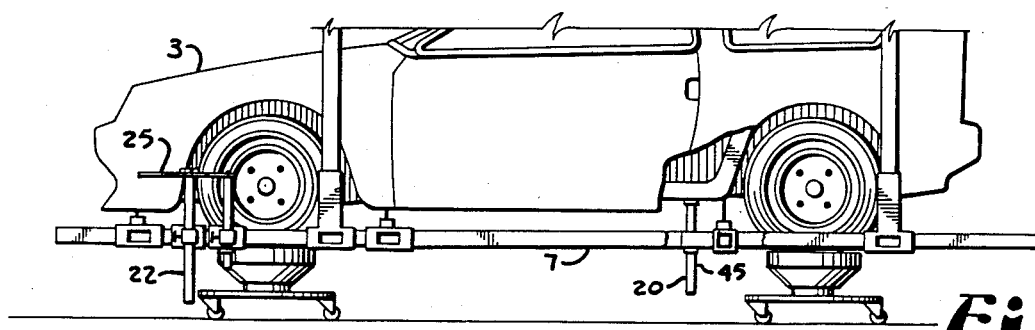
FIG. 2 is a fragmentary, side elevational view of the hole gauge arrangement shown in connection with the vehicle.
Figure 3:
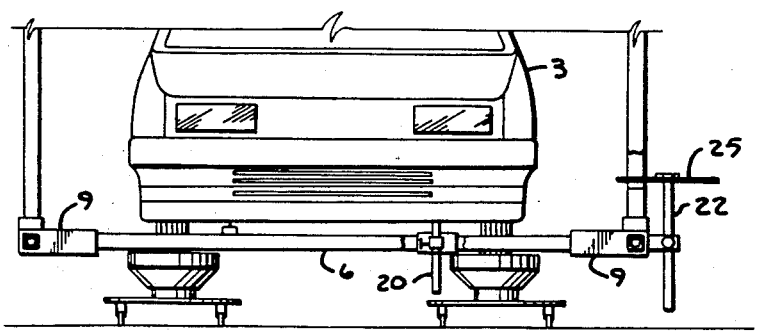
FIG. 3 is a fragmentary, front elevational view of the hole gauge arrangement shown in connection with the vehicle.

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ their present invention in virtually any appropriately detailed structure. Referring to the drawings in more detail:

The reference No. 1, FIGS. 1, 2, 3 and 4, generally indicates a hole gauge arrangement embodying the present invention. In FIG. 1, the apparatus 1 is shown in connection with a vehicle body and frame checking and measuring apparatus 2 mounted to a vehicle 3. The vehicle checking and measuring apparatus 2 includes front and rear transverse bars 5 and 6 which are suspended from the vehicle by means such as shown in our U.S. Pat. No. 4,330,945 and situated so as to be positioned in the imaginary datum plane of the vehicle 3. The distance from the various vehicle parts to the datum plane is found in various frame and body books and tables and in manuals and drawings produced by the manufacturer of the vehicle.

Longitudinal or datum plane bars 7 and 8 are also positioned in the vehicle datum plane and are connected to the transverse bars 5 and 6 by mounting tees 9. To control the body and frame measurements in three axes, the transverse bar 5 establishes a lateral or X axis, which is centered on a vehicle center line 10, the longitudinal or datum plane bars 7 and 8 form a Y axis and the transverse bars 5 and 6 and longitudinal bars 7 and 8 are suspended in the datum plane of the vehicle, the vertical distance from which constitutes the Z axis.

By way of explanation, assume that the repairman desires to check the correspondence of a vehicle fixture hole 12 to blue print specifications. The location of the fixture hole 12 is stated in terms which correspond to measurements along X, Y and Z axes. To set the vehicle checking and measuring apparatus 2 so that the vehicle fixture hole 12 can be determined, a transverse bar 14 is positioned to form an X axis as noted by measurements on the Y axis longitudinal or datum plane bars 7 and 8. The transverse bar 14 is maintained in position mounted to the longitudinal bars 7 and 8 by tees 9. Next, using a scale on the transverse bar 14 for reference, a support means 16 is positioned on the transverse bar 14 laterally or outwardly of the center line 10, at a location corresponding to the Y axis, and as determined by specifications set forth in the vehicle frame reference book. Finally, measurement is made in the vertical, or Z dimension from the location of the support means 16 and the vertical dimension should then coincide exactly with the vehicle fixture hole 12, if the hole 12 is located as specified. If it is not, then the hole 12 is mislocated and can be brought into correct location through various and well known damage removal means, such as by connecting pulling and pushing rams and the like to the distorted areas.

Prior checking and measuring apparatus's have used various pointer bars, some of which may extend into the vehicle fixture hole 12 to different depths. Protrusion into the fixture hole may result in misidentification of its location because the specifications measure the hole to its juncture with the frame member. For example, the tip of the pointer may not be located precisely at the entrance to the fixture hole or may extend therein as much as one-half inch. For critical body parts, such as suspension components, the mismeasurement caused by a pointer tip extending into the fixture hole instead of being precisely located at the entrance of the hole, may be significant and result in imprecise alignment and repair.

The present invention provides for precise determination of vertical height of a fixture hole above a datum plane and provides that measurement independently of the size of the fixture hole 12. The invention includes an elongate set rod 18 with a die means 19 mounted to and extending outwardly from a remote end of the set rod 18, an elongate measuring rod 20 which is used with the set rod 18, and die means 19 as described below.

In the illustrated example, the set rod 18 is of elongate cylindrical stock and has a measurement scale 22 thereon which originates at a remote end 23 of the rod 18. The die means 19 in the illustrated example, includes a circular die wheel 25 rotatably and normally mounted on the remote end 23 and having a series of progressively sized bores 26 extending therethrough. Preferably, the center of each of the bores 26 is aligned on equal length radii from the axis of rotation of the die wheel 25, FIG. 5. Preferably, the bores of the die wheel 25 are sized to accord with the normal sizes of fixture holes used in the construction of a vehicle 3 and progress from the smallest such normally employed hole to the largest. A label 27 centered on the die wheel 25 indicates the measurements of the corresponding bores 26. In the illustrated example, the measurements are in millimeters for metric specification frames.

The set rod 18 with its die wheel 25 is mounted on a first gauge mount 29 which is affixed to a suitable support structure located relatively close to the vehicle 3 for efficiency of the workman. In the illustrated example, the support structure is a part of the vehicle checking and measuring apparatus 2 and more specifically, the first gauge mount 29 is attached to the datum plane bar 7. The exemplary gauge mount 29 includes means for connection to the support structure, such as a tubular portion 31 and an outwardly extending rod holder portion 32 with a vertical bore therethrough, through which the measuring rod 20 extends. A thumb screw 34 extends through the rod holder portion 32 and tightens against the measuring rod 20 set therein to maintain the rod in a selected amount of extension. The gauge mount 29 also includes a thumb screw 35 for securing the gauge mount 29 on one of the bars 5 through 8 as desired.

The measurement rod 20, in the illustrated example, is also elongate and cylindrical and is formed of a primary section 37 with extensions 38 and 39 which may be used as necessary. The extensions 38 and 39 are the screw on type with threaded interconnections (not shown) between the primary section 37 and the extensions 38 and 39. A pointer tip end 41 is located on a remote end of the measurement rod 20 and, in the illustrated example, is a 45 degree cone converging to a sharp tip and which is of a size larger than the size of the vehicle fixture hole 12 under scrutiny. Preferably, the hole gauge arrangement 1 is provided with a plurality of pointer tip ends 41 of differing circumference so as to assure that the tip ends 41 will generally correspond with the size of the fixture hole 12, yet be slightly larger than the same so that the selected tip end does not fit entirely within the hole 12.

A tightenable collar 42 encircles about the lower end of the measurement rod 20 and provides a lower stop means for a purpose later described.

The measurement rod 20 extends from a second gauge mount 43 which is of the same configuration as the first gauge mount 29.

In use, the first gauge mount 29 is mounted to suitable support structure, such as the datum plane bar 7, and the set rod 18 is extended therefrom to the vertical measurement indicated in the appropriate body and frame specification book, for example seven inches. This is the distance from the vehicle datum plane to the entrance of the vehicle fixture hole 12. Then, the die wheel 25 is rotated to select the size of the bore 26 which generally corresponds to the dimensions of the subject fixture hole 12, FIGS. 4 and 5. A second gauge mount 43 is positioned adjacent the first gauge mount 29 and the measurement rod 20 extended from the second gauge mount 43 parallel to the set rod 18 and into engagement with the selected bore 26. Extensions 38 and 39 are selected with consideration for the approximate length of the measurement rod 20 required and a pointer tip end 41 is selected with consideration for the size of the selected bore 26 in the die wheel 25. Once the measurement rod 20 is extended upwardly until abutment of the pointer tip end 41 with the selected bore 26, the stop or collar 42 is pushed upwardly until abutment with the second gauge mount 43 and the collar 42 tightened so as to prevent further upward extension when the measurement rod 20 is removed from the second gauge mount 43 as described below.

Now the measurement rod 20 must be moved to the fixture hole 12. The measurement rod 20 is moved by either disconnecting the second gauge mount 43 from the bar 7 and moving it to an appropriate location on the transverse bar 14 or by providing a third gauge mount 45 and positioning the mount 45 at the selected location underneath the fixture hole 12. In this example, the measurement rod 20 is removed from the second gauge mount 43 and transferred to the third gauge mount 45, FIG. 6. Transfer is easily accomplished by moving the measurement rod 20 from the second gauge mount 43 by unscrewing the pointer tip end 41, leaving the collar 42 in place, and dropping the rod 20 downwardly from the second gauge mount 43. The separate pieces are then transferred to the third gauge mount 45 and the rod 20, less the tip end 41, is inserted upwardly through the third gauge mount 45 and the tip end 41 then secured to the remainder of the rod. The entire measurement rod 20 is pushed upwardly until abutment of the collar 42 with the mount 45 and the thumb screw 34 tightened to maintain the measurement rod 20 at the selected height, which is the same height as previously established on the set rod 18. The pointer tip end 41 will extend into the vehicle fixture hole 12 the same distance that the pointer tip end 41 previously extended into the selected bore 26, thus, the amount of extension of the tip end 41 into the hole 12 had previously been established in relation to the bore 26 in the die wheel 25 so that precise measurement of distance is possible. Leaving the thumb screw 34 tight, the measurement rod 20 remains in place on the vehicle checking and measuring apparatus 2 and the workman can readily visually determine any movement of the vehicle frame or body from the established datum plane, FIG. 3.

It is to be understood that while one form of this invention has been illustrated and described, it is not to be limited to the specific form or arrangement of parts here and described and shown, except insofar as such limitations are included in the following claims.

What is claimed and desired to secure by Letters Patent is:

1. A hole gauge arrangement for determining the distance of a fixture hole relative to a datum plane, said arrangement comprising:
   (a) an elongate set rod with a measurement scale thereon;
   (b) die means mounted to and extending outwardly from a remote end of said set rod;
   (c) a first gauge mount with said set rod extending therefrom, each said gauge mount including means for connection to a support structure and an adjustable rod holder means for setting an extension of said rod relative to said gauge mount;
   (d) an elongate measurement rod having a tip end; and
   (e) a second gauge mount positionable against said first gauge mount with said measurement rod extending therefrom, said second gauge mount being connectible to said support structure and said measurement rod being extensible through said second gauge mount so that said tip end encounters said die means, whereby the height of said measurement rod is set to the height of said set rod, said second gauge mount with said measurement bar thereon being transferrable to a support structure located in a datum plane and positionable thereon aligned with a fixture hole, whereby the spatial relationship of said tip end to said fixture hole is determined.

2. A hole gauge arrangement for determining the distance of a fixture hole relative to a datum plane, said arrangement comprising:
   (a) an elongate set rod with a measurement scale thereon;
   (b) die means mounted to and extending outwardly from a remote end of said set rod;
   (c) a first gauge mount with said set rod extending therefrom, each said gauge mount including means for connection to a support structure and an adjustable rod holder means for setting an extension of said rod relative to said gauge mount;
   (d) an elongate measurement rod having a tip end and a stop variably positionable a distal end of said measurement rod;
   (e) a second gauge mount positioned adjacent said first gauge mount with said measurement rod extending therefrom, said second gauge mount being connected to said support structure and said measurement rod being extended through said second gauge mount so that said tip end encounters said die means, whereby the height of said measurement rod is set to the height of said set rod, and said stop is positioned against said second gauge mount; and
   (f) a third gauge mount for positioning on support structure located in a datum plane, and for positioning aligned with a selected fixture hole, whereby said measurement rod is transferred from said second gauge mount to said third gauge mount and extended therethrough until said stop engages said third gauge mount, and the spatial relationship of said tip end to said fixture hole is determined.

3. A hole gauge arrangement for determining the distance of a fixture hole relative to a datum plane, said arrangement comprising:
   (a) an elongate set rod having a measurement scale extending substantially the length thereof;
   (b) a circular die wheel rotatably and normally mounted on a remote end of said set rod, and having a series of progressively sized bores extending therethrough which are centered on equal length radii from the axis of said wheel;
   (c) a first gauge mount with said set rod extending therefrom, each said gauge mount including means for connection to a support structure and an adjustable rod holder means for setting an extension of said rod relative to said gauge mount;
   (d) an elongate measurement rod having a pointer tip end and an adjustable stop collar variably positionable about a distal end of said measurement rod;
   (e) a second gauge mount positioned adjacent said first gauge mount with said measurement rod extending therefrom, said second gauge mount being connected to said support structure and said measurement rod being extended through said second gauge mount so that said pointer tip encounters a selected said bore in said die wheel, whereby the height of said measurement rod is set to the height of said set rod, and said stop collar is positioned against said second gauge mount; and
   (f) a third gauge mount for positioning on support structure located in a datum plane, and for positioning aligned with a selected fixture hole, whereby said measurement rod is transferred for said second gauge mount to said third gauge mount and extended therethrough until said stop collar engages said third gauge mount, and the spatial relationship of said pointer tip to said fixture hole is determined.

4. The hole gauge arrangement set forth in claim 3 wherein:
   (a) said pointer tip is detachably mounted on said measurement rod; and
   (b) said hole gauge arrangement includes a plurality of pointer tips of different sizes, whereby the user selects a pointer tip of larger diameter than a selected bore in said die wheel.

5. The hole gauge arrangement set forth in claim 3 wherein:
   (a) said measurement rod is formed of threaded segments for extension to various distances.

6. A hole gauge arrangement for determining the distance of a fixture hole relative to a datum plane, said arrangement comprising:
   (a) an elongate set rod having a measurement scale extending substantially the length thereof;
   (b) a circular die wheel rotatably and normally mounted on a remote end of said set rod, and having a series of progressively sized bores extending therethrough which are centered on equal length radii from the axis of said wheel;
   (c) a first gauge mount with said set rod extending therefrom, each said gauge wheel including means for connection to a support structure and an adjustable rod holder means for setting an extension of said rod relative to said gauge mount;
   (d) an elongate measurement rod including an assortment of screw on extensions and pointer tip ends and having an adjustable stop collar variably positionable about a distal end of said measurement rod;
   (e) a second gauge mount detachably mounted adjacent said first mount with said measurement rod extending therefrom, said second gauge mount being connected to said support structure and said measurement rod being extended through said second gauge mount so a selected said pointer tip end encounters a selected said bore in said die wheel, whereby the height of said measurement rod is set to the height of said set rod, and said stop collar is positioned against said second gauge mount; and
   (f) whereby said measurement rod is transferred and mounted on support structure in the datum plane, positioned aligned with a selected fixture hole, so that the measurement rod is extended toward the fixture hole until stopped by said stop collar, and the spatial relationship of said pointer tip end to said fixture hole is determined.

* * * * *